United States Patent
Janssen

(10) Patent No.: US 8,559,752 B2
(45) Date of Patent: Oct. 15, 2013

(54) IMAGE PROCESSING SYSTEM FOR PROCESSING A DIGITAL IMAGE AND IMAGE PROCESSING METHOD OF PROCESSING A DIGITAL IMAGE

(75) Inventor: Johannes H. M. Janssen, Velden (NL)

(73) Assignee: OCE Technologies B.V., Venlo (NL)

( * ) Notice: Subject to any disclaimer, the term of this patent is extended or adjusted under 35 U.S.C. 154(b) by 92 days.

(21) Appl. No.: 13/207,913

(22) Filed: Aug. 11, 2011

(65) Prior Publication Data

US 2011/0299772 A1 Dec. 8, 2011

Related U.S. Application Data

(63) Continuation of application No. PCT/EP2010/005116, filed on Feb. 1, 2010.

(30) Foreign Application Priority Data

Feb. 13, 2009 (EP) .................................. 09152754

(51) Int. Cl.
  *G06K 9/40* (2006.01)
  *G06K 9/00* (2006.01)

(52) U.S. Cl.
  USPC .......................................... 382/275; 382/167

(58) Field of Classification Search
  USPC ......... 382/275, 274, 254, 260, 261, 163–167, 382/169; 358/1.9, 448, 518–523, 527
  See application file for complete search history.

(56) References Cited

U.S. PATENT DOCUMENTS

| 5,012,333 | A | 4/1991 | Lee et al. |
| 5,832,133 | A * | 11/1998 | Smith .......................... 382/254 |
| 6,047,092 | A * | 4/2000 | Moro ............................ 382/261 |
| 6,317,521 | B1 | 11/2001 | Gallagher et al. |
| 7,085,413 | B2 | 8/2006 | Huang et al. |
| 8,086,030 | B2 * | 12/2011 | Gordon et al. ................ 382/162 |
| 2002/0159080 | A1 | 10/2002 | Feng et al. |
| 2004/0096103 | A1* | 5/2004 | Gallagher et al. ............ 382/167 |
| 2005/0128496 | A1 | 6/2005 | Bala |
| 2007/0019257 | A1 | 1/2007 | Li |
| 2007/0279500 | A1 | 12/2007 | Castorina et al. |

FOREIGN PATENT DOCUMENTS

| EP | 0 723 364 B1 | 4/2000 |
| EP | 1 296 284 A2 | 3/2003 |
| EP | 1 176 801 B1 | 7/2008 |
| WO | WO 02/37832 A2 | 5/2002 |

* cited by examiner

*Primary Examiner* — Yon Couso
(74) *Attorney, Agent, or Firm* — Birch, Stewart, Kolasch & Birch, LLP

(57) ABSTRACT

A processing unit for an image processing apparatus enables the reduction of background noise or disturbances on a scanned image. The processing unit is arranged to apply an image enhancement method to the luminance image data of the scanned image only and merge the obtained modified luminance image data with additional luminance image data obtained from the chrominance image data so as to recover light shades on the background that may have been removed by the image enhancement method.

17 Claims, 6 Drawing Sheets

IMAGE PROCESSING SYSTEM FOR PROCESSING A DIGITAL IMAGE AND IMAGE PROCESSING METHOD OF PROCESSING A DIGITAL IMAGE

CROSS-REFERENCE TO RELATED APPLICATIONS

This application is a Continuation of copending PCT International Application No. PCT/EP2010/051166 filed on Feb. 1, 2010, which designated the United States, and on which priority is claimed under 35 U.S.C. §120. This application also claims priority under 35 U.S.C. §119(a) on Application No. 09152754.9, filed in Europe on Feb. 13, 2009. The entire contents of each of the above documents is hereby incorporated by reference into the present application.

BACKGROUND OF THE INVENTION

1. Field of the Invention

The present invention relates to an image processing system for processing a digital image, such a system, e.g. comprising a scanner or a printer, and to an image processing method of processing digital images such as scanned images.

2. Description of Background Art

Image processing systems as known in the art are widely applied to produce high quality copies of scanned images. As such, an image processing apparatus may include a scanner such as a contact type scanner or a reduction type scanner for scanning an image thereby obtaining a digital representation of the image, i.e. a pixel-based representation of the scanned image, each pixel being described as a combination of RED (R), GREEN (G) and BLUE (B). Such a representation is also referred to as a representation in the RGB color space. Other color spaces such as CMYK are also known for representing the color associated with a pixel of a digitized image. In order to scan the image, an image processing apparatus may, e.g. comprise a charge coupled device (CCD), comprising a plurality of light-sensitive elements or photo-cells. Image processing apparatuses may further comprise a printing unit for providing a printed copy of the scanned image.

In general, an image processing system is further arranged to process the scanned image prior to the printing process. The purpose of such processing is to provide an image enhancement. The image processing system may also be arranged to convert a scanned image from one color space to another. Such a conversion may, e.g. be required when the color space of the scanning unit (e.g. RGB) is different from the available colors in the printing unit. Known processing steps as can be applied by such an image processing system, e.g. include background reduction or contrast enhancements.

The raw image as obtained from the scanner may comprise disturbances introduced during the scanning process. Such disturbances appear in the scanned image as (light) shaded areas on the background of the image. Such disturbances can, e.g. be caused by wrinkles or folds in the image being scanned. In particular, an image obtained from a contact-type scanner may suffer from the occurrence of such disturbances. In order to reduce disturbances occurring on the background of an image, different methods are known in the art. Reference can, e.g. be made to methods involving the determination of a dominant color in the image (or part of the image) and adjusting pixel values based on the dominant color. However, it has been observed that background reduction methods as known in the art not only result in the removal of unwanted shaded areas, they may also result in the removal of light shades that are wanted.

SUMMARY OF THE INVENTION

In view of the above, it is an object of the present invention to provide a processing unit that enables a more selective reduction of the disturbances that appear on the background of a scanned image.

To address this object, an image processing system for processing a digital image is provided, the image processing system comprising:

an input module for receiving the digital image, the digital image comprising luminance image data and chrominance image data;

a background reduction module for generating modified luminance image data by applying a background reduction method to the luminance image data;

a shade enhancement module for generating luminance correction image data by applying a shade enhancement method to the chrominance image data;

a merging module for generating adjusted luminance image data by merging the modified luminance image data and the luminance correction image data; and a conversion module for converting the adjusted luminance image data to an output digital image.

When known background removal algorithms or methods are applied to a digital image (the digital image, e.g. being described as a matrix of pixels defined by a luminance and a chrominance value) comprising disturbances such as light grey shades, more information may be removed that is required or desired. In order to mitigate this, the present invention provides an image processing system arranged to perform a number of processing steps to the digital image. To perform the processing steps, the image processing system comprises a number of modules, which can, e.g. be implemented in software, for performing the processing steps. The image processing system comprises an input module for receiving the digital image, such digital image in general comprising luminance image data and chrominance image data. When the digital image is received by the image processing system, a background reduction method is applied by a background reduction module of the system to the luminance image data comprised in the digital image. In order to address only the luminance data of the digital image, it may be required to convert the digital image as received to a separate luminance image and a chrominance image. By applying the background reduction method to the luminance image data, modified luminance image data is obtained. By doing so, a more selective way of removing disturbances in the background of the digital image is obtained. It has been observed that, although the disturbances as described affect all three channels in a conventional RGB system, the disturbances appear in a different degree in the luminance image data and in the chrominance image data. As an example, when a contact type scanner is used, it has been observed that the luminance of an image is more disturbed than the chrominance of an image. It is believed that, e.g. a height variation of the hardcopy that is scanned (the height variation, e.g. being caused by wrinkles or folds) causes a variation in the amount of light that is received by the color channels of the RGB system (i.e. the light sensitive elements that detect the amount of light received), thus affecting the luminance as observed by the scanner, whereas the ratio between the different color channels is substantially unaffected. As such, the background reduction method as applied by the background reduction module, need only be applied to the luminance image data of the digital image. Therefore, the image processing system according to the invention is arranged to apply a background reduction method to the luminance image data thereby obtaining modified luminance image data.

Different background reduction methods can be applied such as clipping luminance values smaller than a threshold value to correspond to white. Alternatively, the luminance image can be converted using a look-up table (LUT), thereby further reducing small luminance values and (optionally) increase high luminance values.

In an embodiment, the background reduction method as applied by the background reduction module of the image processing system comprises a step of clipping to white applied prior to a step of spatial filtering (high frequency enhancement), and followed by a step of converting the luminance data using an LUT. When only the steps of spatial filtering and conversion by an LUT are performed, the background reduction method as applied by the background reduction module provides the advantage that it does not require the selection (estimation) of a threshold value for clipping the background to white. By the spatial filtering step (i.e. high frequency enhancement step), information having a comparatively high spatial frequency such as text and lines, can be enhanced. As a result, the distinction between this information and the background information (e.g. (light) shaded areas) can be enlarged. The step of spatial filtering may further comprise a low frequency suppression to weaken the image information having a comparatively low spatial frequency. The spatial filtering thus enables the enhancement of certain spatial frequency regions.

When a background reduction method is applied to the luminance image data, it may occur that not only unwanted light shades are removed but also some of the wanted light shades from the original image. In order to, at least partly, restore these wanted light shades, the image processing system according to the invention comprises a shade enhancement module for generating luminance correction image data by applying a shade enhancement method to the chrominance image data. It has been devised by the inventors that, in particular, yellow and green shades tend to be clipped to a maximum luminance thus removing such wanted shades. In order to restore these shades, the chrominance information of the original image (e.g. the 'a' and 'b' components when the image data is available in the Lab color space) is translated to luminance correction image data by the shade enhancement module.

In an 8-bit representation of the luminance and chrominance data, this can, e.g. be done by determining the luminance correction image data of a pixel as a function of a and b (e.g. 255−a+b), a and b being the chrominance image data of the pixel and 255 corresponding to no additional luminance.

The image processing system according to the invention further comprises a merging module for generating adjusted luminance image data by merging the modified luminance image data and the luminance correction image data. In a particular embodiment, such merging of the modified luminance image data and the luminance correction image data is done by selecting, on a pixel by pixel basis, the darker of both luminance values. Alternatively, the merging of the modified luminance image data and the luminance correction image data can also be obtained by averaging the modified luminance image data and the luminance correction image data.

The image processing system according to the invention further comprises a conversion module for converting the adjusted luminance image data to an output digital image by combining the adjusted luminance image data with the chrominance image data of the original image in order to obtain color output. Alternatively, conversion of only the luminance information to an output digital image results in a greyscale or black and white output digital image.

In an embodiment, the image processing system according to the invention further comprises a printer for processing the output digital image to a printed image. The image processing system according to the invention may also comprise a scanner such as a contact-type scanner for scanning an original image and converting it to a digital image, the digital image further being processed by the different modules as discussed above.

The present invention further provides for an image processing method of processing a digital image, the method comprising the steps of:

receiving a digital image comprising luminance image data and chrominance image data;

generating modified luminance image data by applying a background reduction method to the luminance image data;

generating correction luminance image data by applying a shade enhancement method to the chrominance image data;

generating adjusted luminance image data by merging the modified luminance image data and the correction luminance image data; and converting the adjusted luminance image data to an output digital image.

The image processing method according to the invention provides for a way to reduce an occurring background on an original by applying a background reduction method to luminance image data of a digital image. The method further includes a correction to, at least partly, compensate for the reduction of unwanted, e.g. light shades on the original image. This is done by applying a shade enhancement method to chrominance image data of a digital image to obtain correction luminance image data and merge the correction luminance image data with modified luminance image data (obtained from the application of the background reduction method to the luminance image data) to obtain adjusted luminance image data. According to the method, the adjusted luminance image data is further converted to an output digital image.

The method of the invention can, e.g. be implemented in software, i.e. as a computer program arranged to perform the steps of the image processing method on a digital image. As such, the invention further provides a data carrier (e.g. a disc such as a CD-ROM or a hard-disk or a memory unit such as a USB memory stick) comprising the computer program.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be explained further with reference to the accompanying drawings, wherein.

DETAILED DESCRIPTION OF THE INVENTION

The present invention relates to an image processing system arranged to enhance the quality of a digital image by performing a number of processing steps to the image.

Figure 1:
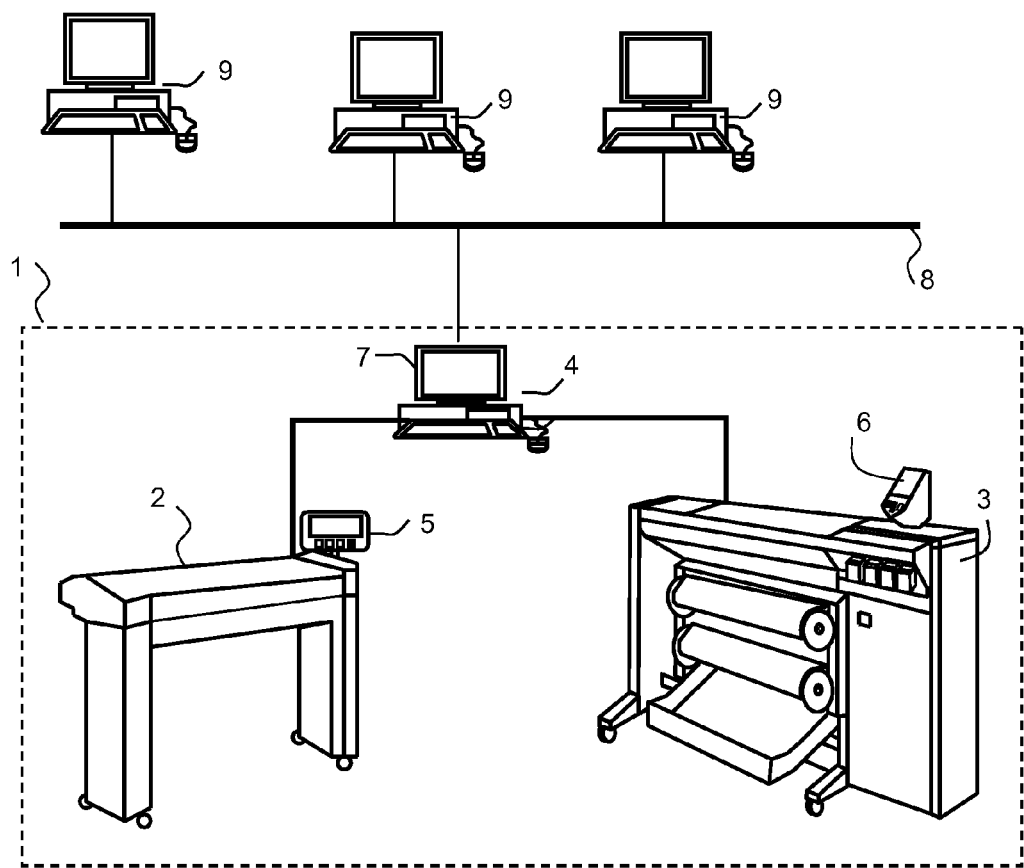
FIG. 1 schematically depicts a first embodiment of an image processing system according to the present invention.

An embodiment of the image processing system according to the invention is, e.g. illustrated in FIG. 1. FIG. 1 schematically depicts an image processing system 1 comprising a scanning unit 2, a printing unit 3 and a control unit 4.

The scanning unit 2 is provided for scanning an original color document supported on a support material. In the presented embodiment the scanning unit has a CCD type color image sensor (i.e. a photoelectric conversion device) which converts the reflected light into electric signals corresponding to the primary colors red (R), green (G) and blue (B). A local user interface panel 5 is provided with an input device, such as buttons, and an output device, such as a display, for starting scan and copy operations.

The printing unit 3 is provided for printing digital images on image supports. The printing unit may use any number of printing techniques. It may be a thermal or piezoelectric inkjet printer, a pen plotter, or a press system based on organic photoconductor technology, for instance. In the example shown in FIG. 1, printing is achieved using a wide format inkjet printer provided with four different basic inks, such as cyan, magenta, yellow and black. The housing contains a printer head which is mounted on a carriage for printing swaths of images. The images are printed on an ink receiving medium such as a sheet of paper supplied from a paper roll. A local user interface panel 6 is provided with an input device, such as buttons, and output device, such as a display, for selecting a user, a job and for starting a printing operation, etc.

The scanning unit 2 and the printing unit 3 are both connected to a control unit 4. The control unit 4 executes various tasks such as receiving input data from the scanning unit 2, handling, scheduling and processing the submitted data files, controlling the scanning unit 2 and the printing unit 3, converting image data into printable data, etc. The control unit 4 is provided with a user interface 7 for offering the operator an extensive menu of commands for executing tasks and making settings. The various modules of the image processing system according to the invention which are used for processing a digital image are implemented in the control unit 4. These modules, i.e. an input module, a background reduction module, a shade enhancement module, a merging module and a conversion module are discussed in more detail below.

Moreover, the control unit 4 is connected to a network 8 so that a number of client computers 9, also connected to the network 8, may use the image processing system 1.

Figure 2:
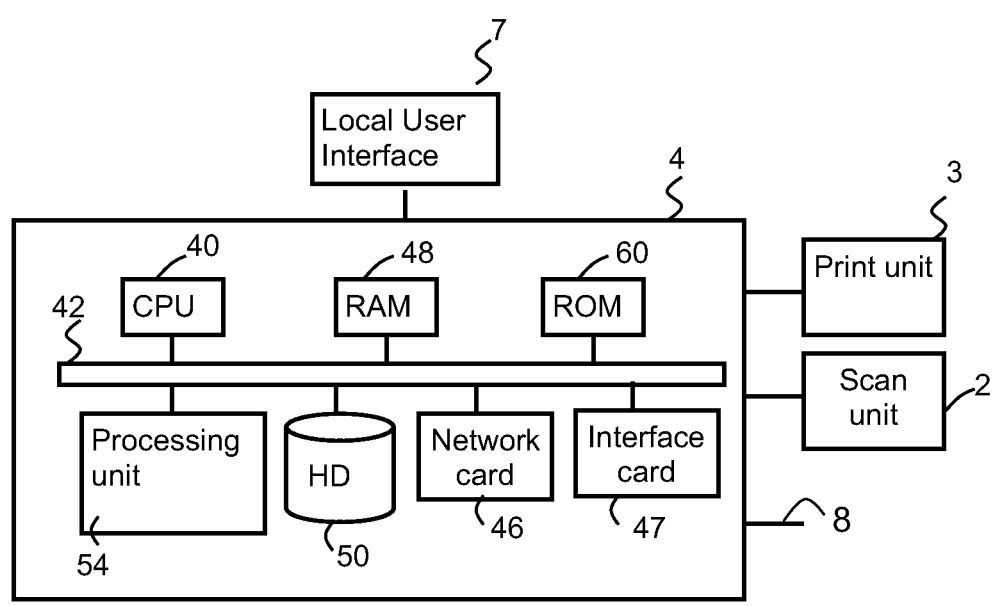
FIG. 2 schematically depicts a control unit of an image processing system.

A possible arrangement of the control unit 4 is presented in more detail in FIG. 2. As shown in FIG. 2, the control unit 4, as applied in the image processing system 1 comprises a Central Processing Unit (CPU) 40, a Random Access Memory (RAM) 48, a Read Only Memory (ROM) 60, a network card 46, an interface card 47, a hard disk (HD) 50 and a processing unit 54. The aforementioned units are interconnected through a bus system 42, the control unit 4 is connected to a network 8.

The CPU 40 controls the respective units of the control unit 4, a local user interface 7, scanning unit 2 and the printing unit 3, in accordance with control programs stored in the ROM 60 or on the HD 50.

The ROM 60 stores programs and data such as a boot program, a set-up program, various set-up data or the like, which are to be read out and executed by the CPU 40.

The HD 50 is an example of a storage unit for storing and saving programs and data which make the CPU 40 execute a printing process to be described later. The HD 50 also comprises an area for saving the data of externally submitted print jobs. The programs and data on the HD 50 are read out onto the RAM 48 by the CPU 40 as needed. The RAM 48 has an area for temporarily storing the programs and data read out from the ROM 60 and HD 50 by the CPU 40, and a work area which is used by the CPU 40 to execute various processes. Interface card 47 connects the control unit 4 to scanning unit 2 and printing unit 3. Network card 46 connects the control unit 4 to the network 8 and is designed to provide communication with the workstations 9, and with other devices reachable via the network.

The processing unit 54, may be implemented either as a software application program running under control of an operating system and executed by CPU 40; as a firmware program running under control of an operating system and executed by CPU 40; or as a firmware program embodied as one or more FPGLA's with or without its own processor. The processing unit 54 includes functions for reading, interpreting, processing and rasterizing the print job data. The print job data may, e.g. contain image data to be printed (i.e. fonts and graphics that describe the content of the document to be printed, described in a Page Description Language or the like), image processing attributes and print settings. The processing unit 54 further includes the various modules (i.e. the input module, the background reduction module, the shade enhancement module, the merging module and the conversion module) of the image processing system according to the invention which are used for processing a digital image. These modules, being part of the processing unit, are, alone or in combination, implemented in ways indicated above.

Basic modes of operation for the image processing system 1 can include scanning, copying and printing. With the electric signals corresponding to the primary colors red (R), green (G) and blue (B) obtained during scanning, a digital image is assembled in the form of a raster image file. A raster image file is generally defined to be a rectangular array of regularly sampled values, known as pixels. Each pixel (picture element) has one or more numbers associated with it, generally specifying a color which the pixel should be displayed in. The representation of an image may have each pixel specified by three 8 bit (24 bits total) colorimetric values (ranging from 0-255) defining the amount of R, G, and B respectively in each pixel. In the right proportions, R, G, and B can be combined to form black, white, 254 shades of grey, and a vast array of colors (about 16 million). The digital image obtained by the scanning unit 2 can be stored on a memory of the control unit 4 and be handled according to a copy path, wherein the image is printed by the printing unit 3. Alternatively, the digital image can be transferred from the control unit 4 to a client computer 9 (scan-to-file path). Finally, a user of a client computer 9 may decide to print a digital image, which reflects the printing mode of operation of the system.

Various embodiments of the image processing system according to the invention are described in further detail below.

Figure 3A:
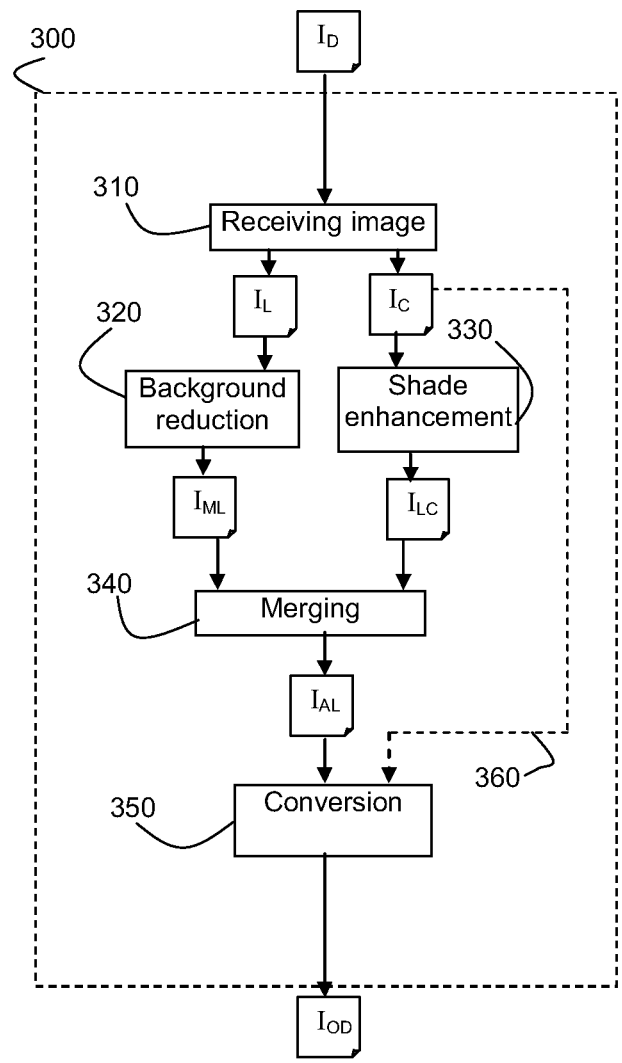
FIG. 3a schematically depicts a second embodiment of an image processing system according to the present invention.

FIG. 3a schematically depicts an embodiment of an image processing system 300 according to the present invention, the image processing system 300 comprising modules 310, 320, 330, 340 and 350. The modules may be embodied as software components running under a certain operating system on a computer or they may be embodied in hardware as dedicated circuits like FPGAs or the like. Images going from one module to another are indicated as rectangles with a folded corner. In the following, an image is indicated by "I" and represents a set of image data.

Figure 3B:
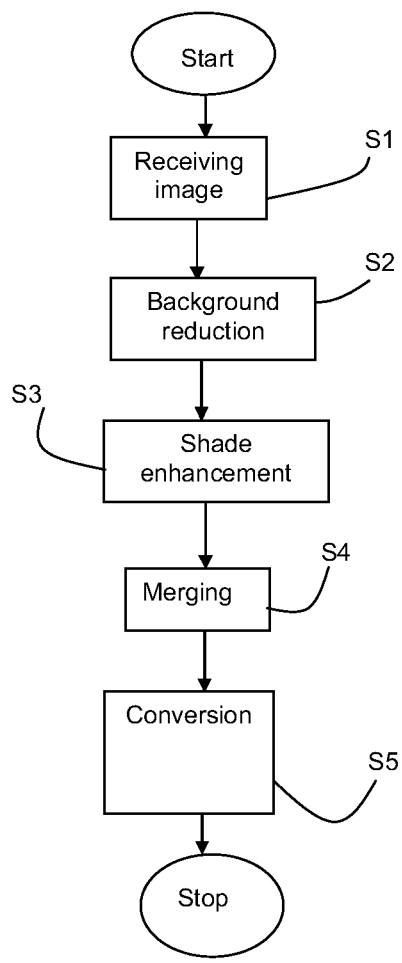
FIG. 3b schematically depicts a flow chart describing the different processing steps as can be performed by the second embodiment of the image processing system according to the present invention.

FIG. 3b schematically provides a flow diagram representing an embodiment of the image processing method according to the invention comprising steps S1-S5.

FIGS. 3a and 3b are related in the sense that typically a particular module (as illustrated in FIG. 3a) is arranged to carry out a particular step of the method illustrated in FIG. 3b.

In a first step S1, as shown in FIG. 3b, which, in the embodiment presented, is executed by input module 310 of FIG. 3a, a digital image $I_D$ is received by the image processing system 300. The image will, in general, comprise luminance image data (providing information on the brightness of the image), represented by the luminance image $I_L$ and chrominance image data (providing information on the color of the image), represented by the chrominance image $I_C$. Depending on the format in which the digital image $I_D$ is provided to the image processing system, the digital image $I_D$ needs to be converted to separate the luminance image data and the chrominance image data, thereby forming a luminance image $I_L$ and a chrominance image $I_C$. It is to be noted that such processing of the digital image $I_D$ towards luminance image data and chrominance image data can be done in various color spaces, such as Lab, LCH, IPT, YCbCr (also known as YCC), XYZ, etc., wherein Lab and LCH are expressions of the same color space in Cartesian resp. polar co-ordinates.

In a next step S2, as shown in FIG. 3b, executed by background reduction module 320 of the image processing system 300 as shown in FIG. 3a, a background reduction method is applied to the luminance image $I_L$ thereby obtaining modified luminance image data, represented by a modified luminance image $I_{ML}$ in FIG. 3a. Various examples of background reduction methods are described in more detail below.

In a next step S3, as shown in FIG. 3b, which can be executed by a shade enhancement module 330 of the image processing system 300 as shown in FIG. 3a, the image processing method according to the invention provides for determining luminance correction image data from the chrominance image data. In FIGS. 3a and 3b, this is indicated as "shade enhancement." The shade enhancement process results in luminance correction image data (indicated by the luminance correction image $I_{LC}$ in FIG. 3a), which are determined on the basis of the chrominance image data, represented by the chrominance image $I_C$ of the digital image $I_D$. It is to be noted that steps S2 and S3 can also be performed in parallel rather than sequentially as indicated in FIG. 3b.

In a next step S4, e.g. executed by a merging module 340 of the image processing system 300 of FIG. 3a, the modified luminance image data, represented by the modified luminance image $I_{ML}$ in FIG. 3a and the luminance correction image data, indicated by the luminance correction image $I_{LC}$ in FIG. 3a, are merged, to form adjusted luminance image data, represented by the adjusted luminance image $I_{AL}$ in FIG. 3a. The merging of the modified luminance image data and the luminance correction image data (step S4 as indicated in FIG. 3b and executed by merging module 340 as shown in FIG. 3a) can, e.g. be performed by combining the modified luminance image data and the luminance correction image data (e.g. taking the average value of the modified luminance image data and the luminance correction image data) or by selecting either one, e.g. selecting, on a pixel by pixel basis, the darker of the modified luminance image data and the luminance correction image data.

The adjusted luminance image $I_{AL}$ is converted, in a further step S5, as indicated in FIG. 3b and executed by conversion module 350, optionally together with the chrominance image $I_C$ of the digital image (as indicated by the dotted line 360 in FIG. 3a), to an output digital image $I_{OD}$. When converted without the chrominance image data, the adjusted luminance image data, represented by the adjusted luminance image $I_{AL}$ can directly be applied to generate a greyscale or black and white output digital image represented by the adjusted luminance image $I_{OD}$. In a preferred embodiment, the image processing system according to the invention is arranged to convert the output digital image $I_{OD}$ to an output image in a color space of an output unit such as a printer. Equally, the image processing system can be arranged to convert the output digital image to an image in a standard color space such as sRGB or AdobeRGB.

In accordance with the present invention, a background reduction method is applied to luminance image data of a digital image thereby obtaining modified luminance image data.

Figure 4A:
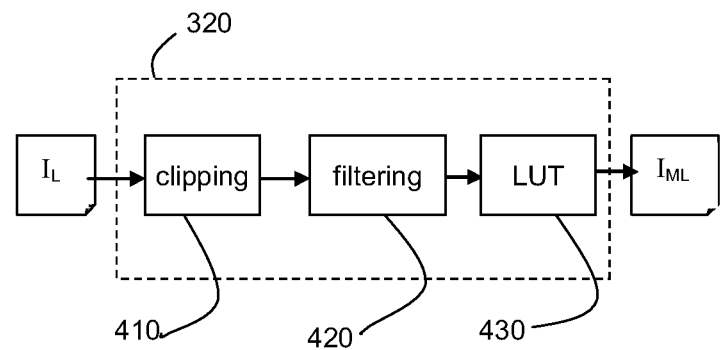
FIG. 4a schematically depicts a background reduction module as can be applied in the image processing system according to the present invention.
Figure 4B:
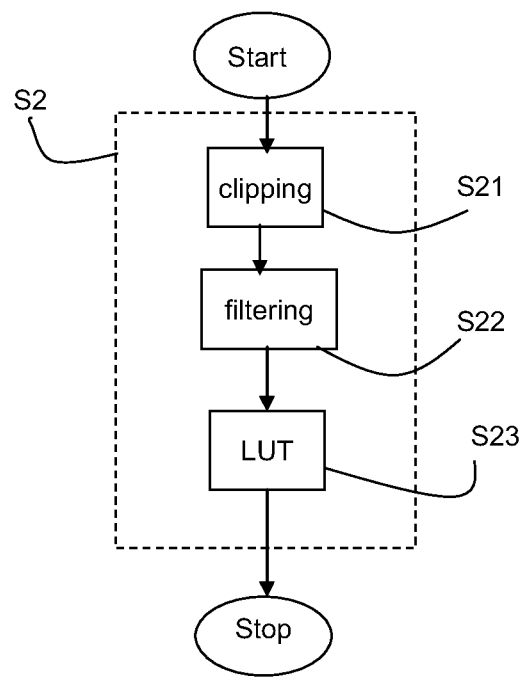
FIG. 4b schematically depicts a second flow chart describing different background reduction steps as can be performed by the image processing system according to the present invention.

FIGS. 4a and 4b schematically depict further details of a background reduction module 320 of the image processing system according to the invention and the corresponding background reduction step S2 as applied in the image processing method according to the invention. The step of performing a background reduction (e.g. step S2 as shown in FIG. 3b and performed by background reduction module 320 of FIG. 3a) can be realized in different ways and can comprise multiple steps. When a background reduction step S2 (see FIG. 4b) is applied to luminance image data (represented by the luminance image $I_L$ in FIG. 4a) of a digital image, modified luminance image data (represented by the modified luminance image $I_{ML}$ in FIG. 4a) are obtained.

The background reduction module 320 as shown in FIG. 4a comprises a clipping module 410, a filtering module 420 and an LUT module 430. Each of the modules is arranged to perform a specific background reduction method. The corresponding flowchart of the background reduction method as obtained by the background reduction module 320 of FIG. 4a, (step S2 of FIG. 4b) comprises three steps: a first step S21 of clipping, a second step S22 of filtering and a third step S23 of applying a look-up table (LUT).

Module 410 of the background reduction module 320 of FIG. 4a provides for a first way of reducing or, at least partly, removing background noise or background shades present on a digital image (represented by the digital image data $I_D$) by converting a luminance value of the digital image to a value corresponding to white (e.g. a value of 255 in an 8-bit representation of luminance and chrominance) when the luminance value is above a certain threshold. Step S21 of FIG. 4b schematically indicates the clipping as provided by the clipping module 410 of FIG. 4a. Background reducing by using such a threshold is known per se. As an example, the detection and removal of background on an image is known from U.S. Pat. No. 7,085,413. The method as described involves determining a dominant color (i.e. the background color) and a threshold luminance to compare with the luminance of the dominant color. If the luminance value of the dominant color is higher than the threshold value, the dominant color can, e.g. be set to white, or any other required background color.

Filtering module 420 of the background reduction module 320 of FIG. 4a (and corresponding step S22 of FIG. 4b) provides a second way of background reduction, by applying a high pass filtering. Using such filtering, features having a high spatial frequency can be enhanced while features, such as background noise or shades, having a comparatively low spatial frequency, are substantially not enhanced. As an example of such high pass filtering, a two-dimensional linear filtering can be applied. Two dimensional linear filtering is an operation wherein a pixel input value $pix_{in}(i,j)$ is replaced by a pixel output value $pix_{out}(i,j)$ that can be described as in equation (1):

$$pix_{out}(i,j) = \sum_{k=-N}^{k=N} \sum_{l=-N}^{l=N} pix_{in}(i+k, j+l) * h(k,l) \quad (1)$$

wherein N equals the order of the filter and $h(k,l)$ is generally referred to as the impulse response of the filter. Depending on the form of the impulse response $h(k,l)$, the filter may act as a low pass filter or a high pass filter.

A first example of the impulse response of the filter $h(k,j)$ resulting in an operation as a high pass filter is given by equation (2):

$$h(k,j) = \begin{bmatrix} 0 & -1 & 0 \\ -1 & 5 & -1 \\ 0 & -1 & 0 \end{bmatrix} \quad (2)$$

In this example, the filtering corresponds to a first order high-pass filter, meaning that high spatial frequencies may be enhanced while low spatial frequencies can remain unaffected.

A second example of the impulse response of the filter $h(k,j)$ as can be applied for high pass filtering is given by equation (3):

$$h(k,j) = \begin{bmatrix} 0 & 0 & -1 & 0 & 0 \\ 0 & 0 & 1 & 0 & 0 \\ -1 & 1 & 0 & 1 & -1 \\ 0 & 0 & 1 & 0 & 0 \\ 0 & 0 & -1 & 0 & 0 \end{bmatrix} \quad (3)$$

The impulse response according to equation (3) equally provides a high pass filter. By applying a high pass filtering (e.g. a two-dimensional linear filtering), a background reduction can be obtained by selectively modifying the luminance image data on the basis of the spatial frequency.

LUT module 430 of the background reduction module 320 of FIG. 4a (and corresponding step S23 of FIG. 4b) provides a third way of obtaining a background reduction by applying a look-up table or LUT for converting luminance image data to modified luminance image data. Preferably, the LUT provides a continuous smooth conversion from an input luminance value to an output luminance value. By doing so, the LUT provides a contrast enhancement, by accentuating darker parts of the original image (e.g. comprising lines or text) and attenuating lighter area's (e.g. comprising background noise or shades) on the basis of the intensity (luminance) information. By applying an LUT, a background reduction can be obtained by selectively modifying the luminance image data on the basis of the intensity (i.e. the luminance data itself).

In a particular embodiment, the clipping to white or any other required background color is omitted. In this embodiment the background reduction starts with a high pass filtering, followed by the application of an LUT.

The application of an LUT for selectively modifying the luminance image data on the basis of the intensity is preferred over methods that apply a threshold value. It has been devised by the inventors, on the basis of an analysis of a plurality of original images, that the application of a non-linear continuous curve (as can be described in an LUT) for the reduction of background noise or background shades, provides better results than the application of a threshold (or more than one threshold) for background reduction, as, e.g. described in U.S. Pat. No. 7,085,413.

With respect to the background reduction module and background reduction process as illustrated in FIGS. 4a and 4b, it can further be noted that the background reduction steps and modules as illustrated can also be applied separately or in a different order.

The image processing system according to the invention is further arranged to determine luminance correction image data from the chrominance image data. This process, which is schematically indicated in FIGS. 3a and 3b as "shade enhancement," is described in more detail in FIGS. 5a and 5b.

Figure 5A:
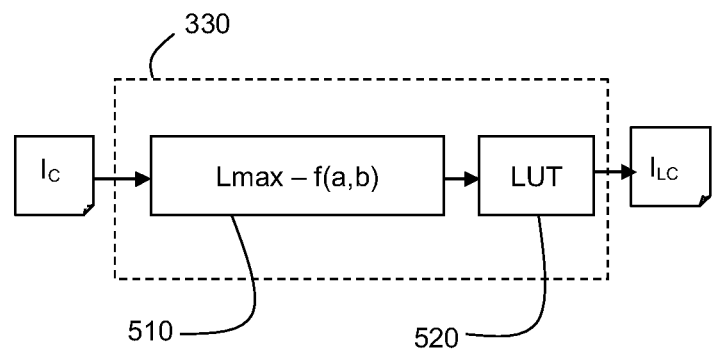
FIG. 5a schematically depicts a shade enhancement module as can be applied in an image processing system according to the present invention.

FIG. 5a schematically depicts an embodiment of a shade enhancement module 330 (as also shown in FIG. 3a). The shade enhancement module 330 as shown in FIG. 5a comprises two modules 510 and 520. The corresponding flowchart of the shade enhancement method as obtained by the shade enhancement module 330 of FIG. 5a, i.e. step S3 of FIG. 5b, comprises two steps S31 and S32.

Figure 5B:
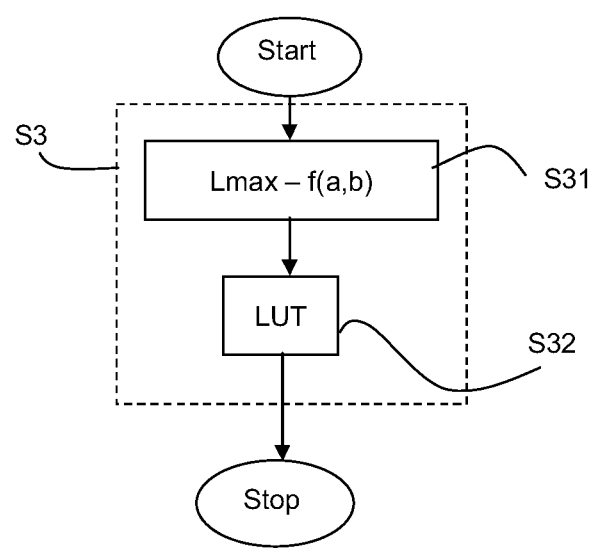
FIG. 5b schematically depicts a flow chart describing different shade enhancement steps as can be performed by an image processing system according to the present invention.

The purpose of the shade enhancement step S3 as shown in FIG. 5b and executed by module 320 of FIG. 5a is to recover (mainly light) shades that may have been removed by the background reduction process, as not only unwanted light shades may have been removed but also some of the wanted light shades from the original image. Recovering, at least partly, those wanted light shades, is done by determining luminance correction image data (indicated by the luminance correction image $I_{LC}$ in FIG. 5a) from the chrominance image data (indicated by the chrominance image $I_C$ in FIG. 5a).

The shade enhancement method as depicted in FIG. 5b comprises a first step S31, which is executed by module 510 of FIG. 5a, wherein the luminance correction image data $I_{LC-intermediate}(i)$ of a pixel i is determined as in equation (4):

$$I_{LC-intermediate}(i) = Lmax - f(a,b) \quad (4)$$

wherein Lmax represent a maximum luminance value (e.g. 255 in an 8-bit representation of luminance) and $f(a,b)$ represents a function of the chrominance image data of the pixel. As an example, $f(a,b)$ may correspond to $-a+b$ or $K \cdot (-a+b)$, wherein K is a scaling factor. By appropriate selection of K, one can ensure that a maximum value of $(-a+b)$ results in a luminance correction data $I_{LC-intermediate}(i)$ equal to zero. Equation (4) thus provides a way to convert the chrominance image data to a luminance value (i.e. a luminance correction image data that can be compared to the modified luminance image data). It can be noted that the calculation of the luminance correction image data $I_{LC-intermediate}(i)$ of a pixel i as indicated by equation (4) can be implemented as an LUT.

In order to retrieve light shades that may have been removed by the background removal process, the luminance of a pixel i can be set equal to the darker of $I_{LC\text{-}intermediate}(i)$ and $I_{ML}(i)$, $I_{ML}(i)$ being the modified luminance image data for pixel i.

The shade enhancement method as depicted in FIG. 5b comprises a second step S32, which is executed by module 520 of FIG. 5a, wherein the luminance correction image data is processed by an LUT for scaling the luminance correction image data.

The present invention thus provides an image processing system for processing a digital image which enables the reduction of background noise or disturbances occurring on the digital image. The image processing system is arranged to apply a background reduction method to the luminance image data of the digital image and merge the obtained modified luminance image data with luminance correction image data obtained from the chrominance image data so as to recover light shades on the background that may have been removed by the background reduction method.

It is worth noting that the image processing system according to the invention is in particular useful for processing image data obtained from a contact type scanner but is not limited thereto. Equally, the background reduction steps and the shade enhancement steps as described are merely to illustrate different implementations of the processing unit according to the invention, the invention not being limited to the examples as shown but only being limited by the claims as formulated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing system for processing a digital image, the image processing system comprising:
   a processor, wherein the processor comprises:
      an input module for receiving the digital image, the digital image comprising luminance image data and chrominance image data;
      a background reduction module for generating modified luminance image data by applying a background reduction method to the luminance image data;
      a shade enhancement module for generating luminance correction image data by applying a shade enhancement method to the chrominance image data;
      a merging module for generating adjusted luminance image data by merging the modified luminance image data and the luminance correction image data; and
      a conversion module for converting the adjusted luminance image data to an output digital image.

2. The image processing system according to claim 1, wherein the background reduction module comprises at least one of:
   a clipping module for clipping the luminance image data to white when a luminance value of the luminance image data is below a threshold value;
   a filter module for spatial filtering the luminance image data; and
   an LUT module for converting the luminance data using an LUT.

3. The image processing system according to claim 2, wherein the LUT provides a substantially continuous non-linear conversion of the luminance image data.

4. The image processing system according to claim 1, wherein the shade enhancement module is arranged to determine the luminance correction image data:
   as a maximum luminance value reduced with a function of the chrominance image data; and/or
   from the chrominance image data using a second LUT.

5. The image processing system according to claim 1, wherein the merging module is arranged to generate the adjusted luminance image data by, on a pixel by pixel basis, selecting a darker one of the modified luminance image data and the luminance correction image data.

6. The image processing system according to claim 1, wherein the conversion module is further arranged to convert the adjusted luminance image data and the chrominance image data to the output digital image in a color space of an output unit of the image processing system.

7. The image processing system according to claim 1, further comprising a scanner for scanning an original image and converting the scanned original image to the digital image.

8. The image processing system according to claim 7, wherein the scanner is a contact-type scanner.

9. The image processing system according to claim 1, further comprising a printer for converting the output digital image to a printed image.

10. An image processing method of processing a digital image, the method comprising the steps of:
   receiving, by a processor, a digital image comprising luminance image data and chrominance image data;
   generating, by the processor, modified luminance image data by applying a background reduction method to the luminance image data;
   generating, by the processor, correction luminance image data by applying a shade enhancement method to the chrominance image data;
   generating, by the processor, adjusted luminance image data by merging the modified luminance image data and the correction luminance image data; and
   converting, by the processor, the adjusted luminance image data to an output digital image.

11. The image processing method according to claim 10, wherein the background reduction method comprises at least one of the steps of:
   clipping the luminance image data to white when a luminance value of the luminance image data is below a threshold value;
   spatially filtering the luminance image data; and
   converting the luminance image data using an LUT.

12. The image processing method according to claim 11, wherein the LUT provides a substantially continuous non-linear conversion of the luminance image data.

13. The image processing method according to claim 10, wherein the shade enhancement step further comprises the steps of:
   generating the luminance correction image data as a maximum luminance value reduced with a function of the chrominance image data; and/or
   generating the luminance correction image data from the chrominance image data using a second LUT.

14. The image processing method according to claim 10, wherein the merging step further comprises the steps of:
   generating the adjusted luminance image data by averaging the modified luminance image data and the luminance correction image data; or
   selecting a darker of the modified luminance image data and the luminance correction image data.

15. The image processing method according to claim 10, wherein the converting step further comprises the steps of:
- converting the chrominance image data to the output digital image; or
- converting the adjusted luminance image data and the chrominance image data to the output digital image in a color space of an output unit of the image processing apparatus.

16. A computer program embodied on a non-transitory computer readable medium and arranged to, when executed, perform the steps of the image processing method of claim 10.

17. A non-transitory data carrier comprising the computer program according to claim 16.

* * * * *